US008650496B1

(12) United States Patent
Van Gestel et al.

(10) Patent No.: US 8,650,496 B1
(45) Date of Patent: Feb. 11, 2014

(54) INFORMATION EXCHANGE AUDIO PLAYER

(75) Inventors: Henricus A. W. Van Gestel, Eindhoven (NL); Klaas K. Raaijmakers, Amsterdam (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/376,861

(22) Filed: Aug. 18, 1999

(30) Foreign Application Priority Data

Aug. 21, 1998 (EP) ..................................... 98202810

(51) Int. Cl.
*G06F 3/00* (2006.01)
*G06F 17/00* (2006.01)
*H04B 7/00* (2006.01)
*G08B 1/08* (2006.01)

(52) U.S. Cl.
USPC ........ 715/745; 700/94; 455/66.1; 340/539.11

(58) Field of Classification Search
USPC ............... 345/967, 864; 455/11.1, 3.05, 3.06, 455/41.2, 45, 66.1, 457; 715/716, 789, 745, 715/747, 733, 748; 700/94; 340/539.11; 84/609; 342/419
See application file for complete search history.

(56) References Cited

U.S. PATENT DOCUMENTS

| 4,348,740 | A | * | 9/1982 | White ............................ 709/253 |
| 5,086,394 | A | * | 2/1992 | Shapira ............................. 705/1 |
| 5,117,358 | A | * | 5/1992 | Winkler ........................ 708/135 |
| 5,539,735 | A | * | 7/1996 | Moskowitz .................... 370/420 |
| 5,764,221 | A | * | 6/1998 | Willard ......................... 345/173 |
| 5,926,765 | A | * | 7/1999 | Sasaki ........................ 455/456.1 |
| 5,986,200 | A | * | 11/1999 | Curtin ............................. 84/609 |
| 6,020,810 | A | * | 2/2000 | Har-Even ....................... 340/328 |
| 6,049,777 | A | * | 4/2000 | Sheena et al. ................... 705/10 |
| 6,058,367 | A | * | 5/2000 | Sutcliffe et al. .................... 705/1 |
| 6,092,049 | A | * | 7/2000 | Chislenko et al. .............. 705/10 |
| 6,150,937 | A | * | 11/2000 | Rackman ................. 340/539.23 |
| 6,629,000 | B1 | * | 9/2003 | Moon et al. ..................... 700/94 |
| 6,757,517 | B2 | * | 6/2004 | Chang .......................... 455/3.05 |

FOREIGN PATENT DOCUMENTS

| DE | 3922677 | A | * | 1/1991 | ............... G06F 3/00 |
| EP | 347491 | A | * | 12/1989 | ............... G08B 1/08 |
| FR | 2615957 | A1 | * | 12/1988 | .............. G01S 13/74 |

OTHER PUBLICATIONS

Sommer, Allison Kaplan. "On the Home Front: The loveling in your hand." The Jerusalem Post, Internet Edition. Jun. 15, 1998. [Retreived on Feb. 27, 2003]. Retrieved from the Internet <URL: http//www.jpost.com/com/Archive/15.Jun.1998/Columns/Article-4.html>.*
Shardanand, Upendra. "Social Information Filtering for Music Recommendation." pp. 1-93.*

\* cited by examiner

*Primary Examiner* — Kieu Vu
*Assistant Examiner* — Blaine Basom

(57) ABSTRACT

A device that enables a user to exchange information with other people about the user's preferences with respect to the primary function in storage. The purpose of the exchange of information is to discover common user preferences or interests. Preferences such as musical taste can be rated by the user and the information exchanged. A comparison is made with other users and when a user is within a certain distance that shares common preferences/interests, the user is told of the other person, and the relative distance of the person having the common interests. The device is suitable for digital audio players, wireless telephones, remote controls, portable television/video/radio devices and can be used to match people based on their common preferences.

3 Claims, 2 Drawing Sheets

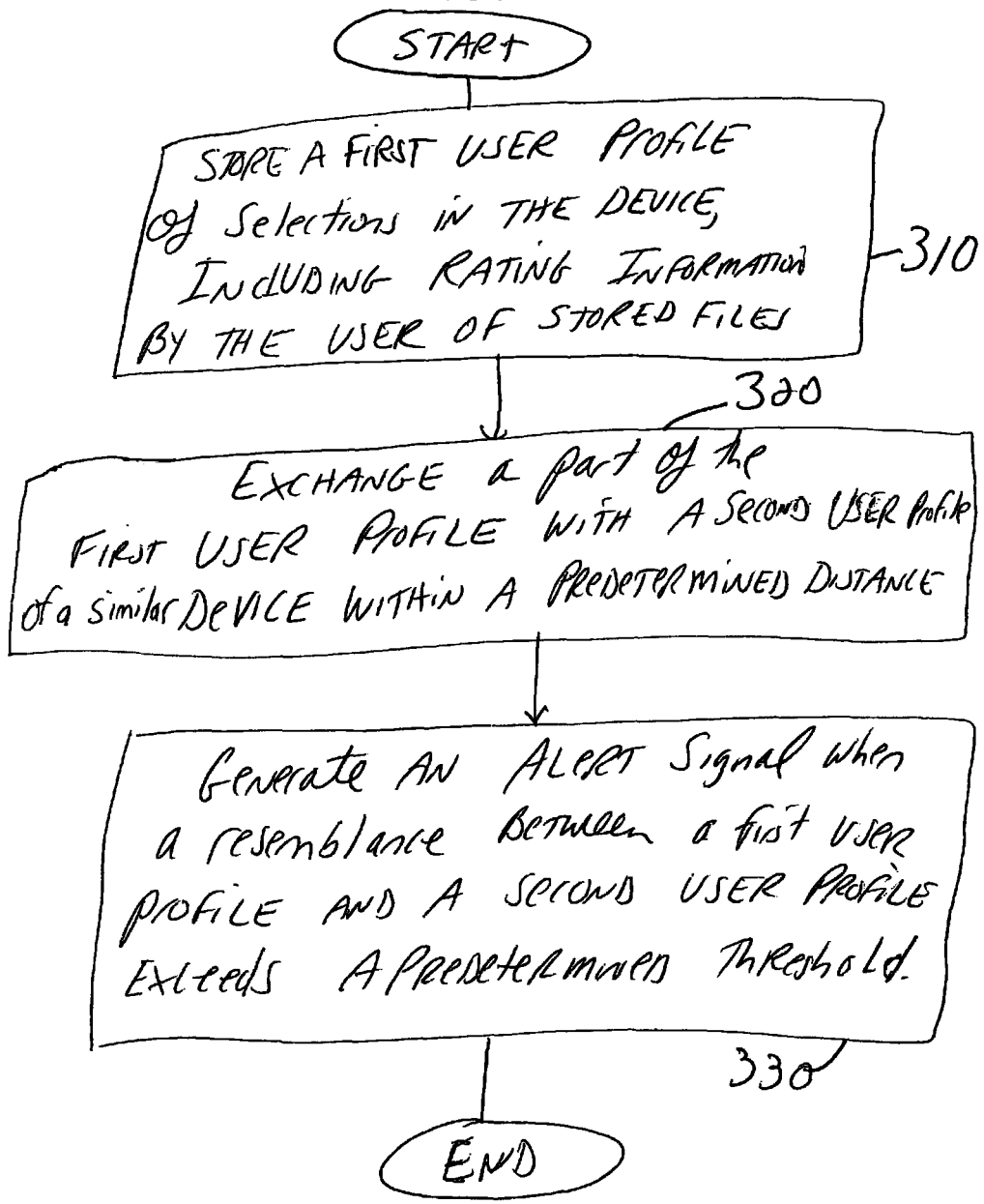

INFORMATION EXCHANGE AUDIO PLAYER

FIELD OF THE INVENTION

The invention relates to an information processing device as defined in the preamble of Claim 1. The invention further relates to a method for processing information as defined in the preamble of Claim 7.

BACKGROUND OF THE INVENTION

A device as defined above is widely known. For example, a CD-player or MP3-player processes digital audio files so as to make them audible through a headphone or loudspeaker. The audio files constitute primary information of the player, since it is the player's primary function to process and play the audio files. An MP3-player comprises a digital memory for storing the audio files, while a CD-player has removable storage means, i.e. respective CDs. As another example, an organizer or personal digital assistant (PDA) enables entry, storage and retrieval of digital data, such as addresses and appointments. Such digital data constitutes primary data of the organizer or PDA since it relates to the primary function of these devices.

The primary data processed by the known devices often reflects aspects of the owner's personality, e.g. music files tell something about the owner's musical taste, and addresses and appointments tell something about the owner's occupations and circle of acquaintances.

OBJECT AND SUMMARY OF THE INVENTION

It is an object of the invention to provide a device that enables a user to exchange information about the user's preferences with respect to the primary function of the device with other people so as to discover common preferences or interests.

To this end, a first aspect of the invention provides a device as claimed in Claim 1. A second aspect of the invention provides a method as claimed in Claim 7. Advantageous embodiments of the invention are defined in the dependent Claims.

The information processing device as defined in Claim 1 enables a user to store a profile of the user's preferences. For example, the owner's musical taste could be represented by a tree of music categories such as classic, jazz, pop, and sub-categories such as baroque music, bebop and rock, each category being rated according to the owner's taste. Furthermore, ratings of composers and performers could be included in the user profile. Such user profiles are well known from internet sites which recommend music to visitors based on the visitor's profile. As another example, the further storage means could contain information about the owner's hobbies or circle of acquaintances. The user profile can be exchanged with people having a similar device, through the communication means of both devices.

In an embodiment of the invention as claimed in Claim 2, the matching means automatically compare the user profile stored in the further storage means and a user profile which is received from a similar device. Hence, the owners of the devices themselves need not search for similarities between their user profiles.

In an embodiment of the invention as claimed in Claim 3, the alerting means constitute an agent which continuously compares user profiles received from similar devices with the user profile stored in the further storage means, and when it detects a strong resemblance between said user profiles, the user is notified of this strong resemblance. For example, the owner of an MP3-player is warned when someone nearby is carrying a similar device and has a similar music taste, enabling both persons to become acquainted and exchange audio files. As another example, the owner of a PDA is warned when someone nearby is carrying a similar device and the user profiles contained in both devices indicate a shared hobby or common acquaintance.

In an embodiment of the invention as claimed in Claim 4, the alerting means also indicate the relative position of the similar device containing the similar user profile. This makes it more easy to locate the user of the similar device in a crowd. The indication could comprise a direction and/or a distance, e.g. indicated by LEDs or graphically.

In an embodiment of the invention as claimed in Claim 5, the matching means describe the resemblance on a graphical display, e.g. enumerating common hobbies or music categories which both users like. In this way, the nature of the resemblance is quickly apparent to the users.

In an embodiment of the invention as claimed in Claim 6, the device comprises profiling means, e.g. a software agent, which monitors the use of the device, i.e. the units of primary information which are being processed and which processing functions of the device are being invoked. From these observations, the profiling means derive profile information which is stored in the further storage means. For example, by monitoring which audio files are played on an MP3-player and utilizing related information which is acquired along with said audio files, e.g. information about composers, performers and music categories, a user profile representing the user's musical taste can be generated. The user profile may also include general information concerning the use of the device, such as the date of acquisition by the owner, the total time of ownership, information about a person from whom a unit of primary information has been acquired, a date or city of the acquisition, a frequency of playing an audio-track, etc. After using the device for some time, the device has built up a history of personal information, which could be valuable for facilitating making contacts with other people. The device according to the invention could play a role in bringing together people having similar tastes or common acquaintances.

The invention is particularly suitable for digital audio players, such as MP3-players, or PDAs. The invention is also applicable, for example, to GSM telephones, remote controls, (portable) television receivers, video recorders etc.

It is to be noted that a device is known, informally called a "lovegetty", which has 4 predefined states and communicates with other lovegetties present within a range of less than 10 meters. When two lovegetties with the same state selected approach each other, they both start to blink and beep.

BRIEF DESCRIPTION OF THE DRAWINGS

These and other aspects of the invention will be apparent from and elucidated by way of a non-limitative example with reference to a drawing in which:

FIG. 3 provides a flowchart showing the steps of a method according to the present invention.

DESCRIPTION OF EMBODIMENTS

Figure 1:
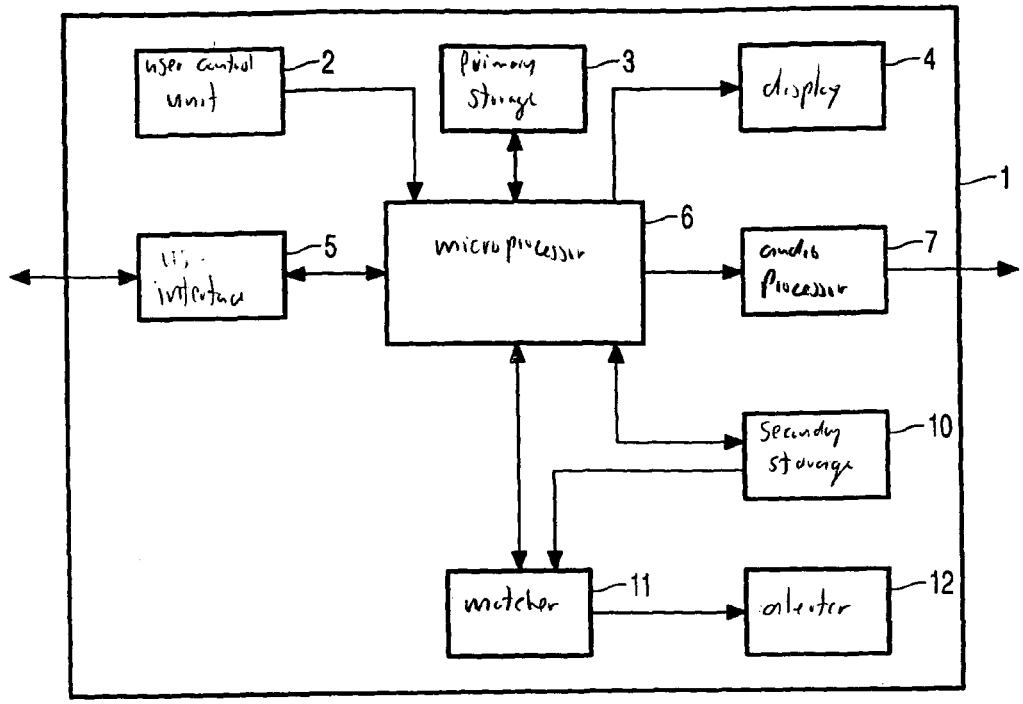
FIG. 1 shows an MP3-player as an aspect of the device according to the invention.

The figure shows an MP3-player 1 which includes a user control unit 2, a primary storage 3, a graphical display 4, an interface 5, a microprocessor 6, an audio processor 7, a secondary storage 10, a matcher 11 and an alerter 12. The user operates the MP3-player 1 by means of the control unit 2 which sends commands to the microprocessor 6. The microprocessor 6 receives commands from the control unit 2; it sends and receives digital audio information and additional data through the interface 5. The microprocessor 6 also stores and retrieves digital audio information in the primary storage 3 and digital data in the secondary storage 10, sends graphical information to the display 4 and digital audio information to the audio processor 7. The audio processor 7 converts the digital audio signals into analog audio signals which can be further processed by a headphone or an amplifier (not shown). The matcher 11 retrieves digital data from the secondary storage 10 and communicates digital data with the microprocessor 6. The matcher 11 also controls the alerter 12.

The MP3-player 1 receives digital MPEG-3 audio files and descriptive information through the interface 5 and stores them in the primary storage 3. In response to a user command, any audio file in the primary storage 3 can be played through the audio processor 7 and listened to by means of e.g. a headphone. The descriptive information, e.g. comprising the title of the audio file, the composer and the performer, is displayed on the display 4 when the corresponding audio file is being played.

The audio files may be derived from a CD-player, from the interne or from a similar MP3-player. Audio files can also be sent to similar MP3-players through the interface 5.

The owner of the MP3-player 1 may store a personal user profile in the secondary storage 10. Such a user profile could be prepared on a personal computer and to be derived through the interface 5. Alternatively, the user profile can be entered by means of the user control unit 2. The user profile contains personal ratings for various music categories, composers, performers etc. The interface 5 is further adapted to communicate with similar devices within a restricted area, for example, having a radius of approximately 10 meters, e.g. by means of electro-magnetic waves or infrared signals. When the presence of a similar device is detected within said range, the user profile is read from the secondary storage 10 and transmitted to the similar device. When a user profile is received from the similar device, it is relayed to the matcher 11, which compares the received user profile with the user profile contained in the secondary storage 10. If the matcher 11 discovers a resemblance, e.g. both user profiles indicate that the respective owners like music composed by Mozart, it controls the alerter 12 to give a signal, e.g. a flashing LED or a beeping sound, and generates a short survey of the resemblance to present it on de display 4. If a user profile is comprehensive and the transmission bandwidth is small, only a part of it could be transmitted initially, e.g. only the categories or composers of the highest rating. If a substantial resemblance is found with respect to these partial user profiles, the complete profiles could be exchanged as yet.

In an advanced embodiment the receiving part of the interface 5 comprises a directional antenna, enabling the relative position of the other device to be determined and indicated on the display 4, e.g. by a graphical representation of an arrow.

Figure 2:
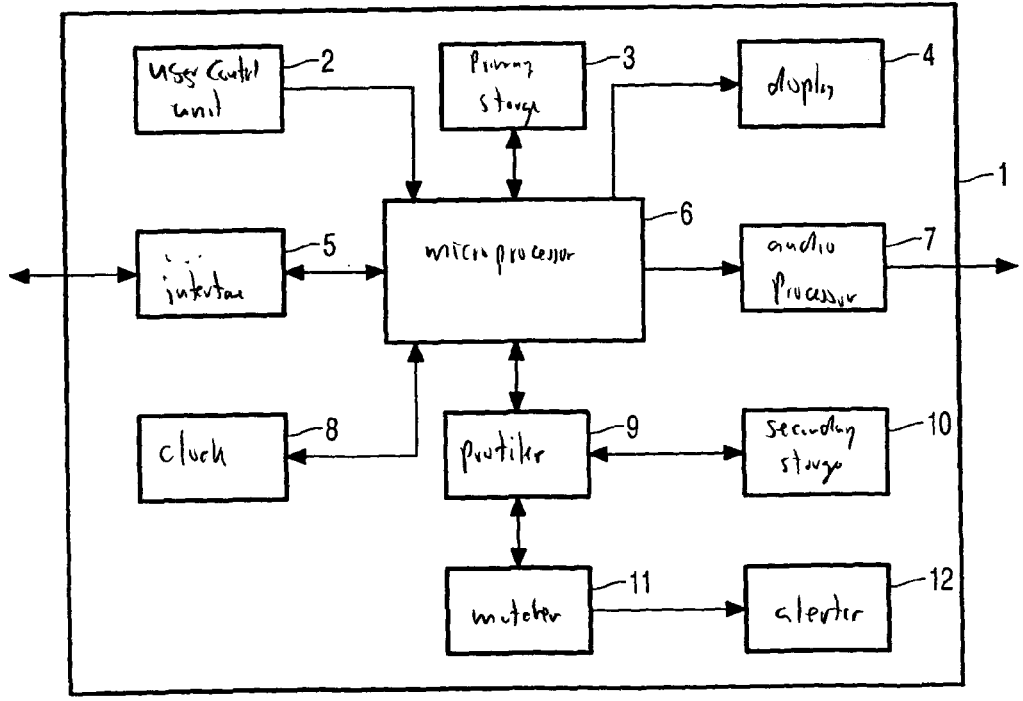
FIG. 2 shows a further MP3-player as an alternative aspect of the device according to the invention.

FIG. 2 shows a further MP3-player as an embodiment of the device according to the invention. Reference numbers which occur in both figures denote the same components. The MP3-player of FIG. 2 includes additionally a clock 8 and a profiler 9. The profiler 9 monitors the use of the device, e.g. it keeps a record of audio files which are stored in the primary storage 3, and how often they are played. It utilizes this data and the descriptive information to determine which music categories, composers and performers the user likes most. Functions invoked by the user while playing an audio file, e.g. sound volume or loudness, could be used to determine whether the user likes certain music as background music or as music to be listened to attentively.

The resultant user profile is stored in the secondary storage 10. Information from the clock 8 is used to determine whether the user's taste depends on the time of the day or changes over time and to generate general information about the use of the device, e.g. the frequency or total time of use. In this way, the profiler 9 generates a large amount of profile information which need not be entered explicitly by the user.

FIG. 3 provides a flowchart illustrating one particular method according to the present invention. At step 310, a first user profile is stored in the device that includes rating information of the user about already-stored files. At step 320, there is an exchange of at least part of the first user profile with a similar device detected within a predetermined distance. The similar device can exchange part of its profile with (a second user profile) the other device. At step 330, the profiles are compared by a matching means of each of the devices and an alert signal can be generated when there is a matching amount of user preferences that exceed a predetermined threshold.

Although the invention has been described with reference to specific illustrative embodiments, variations and modifications are possible within the scope of the inventive concept. Thus, for example, the primary storage 3 and the secondary storage 10 could be distinguishable parts of one large storage, e.g. a flash memory. The profiler 9 could be a separate circuit or be implemented as a software function of the microprocessor 6. The secondary storage 10 may be detachable so as to be processed on a computer or be inserted in a similar device. Furthermore, the device may contain identification means for identifying the user, e.g. by entering a code or analyzing fingerprints, while the secondary storage 10 may be adapted to store user profiles of multiple users of the device. A user operable function may be provided for activating or deactivating the communication with similar devices through interface 5. Furthermore, the interface 5 could be controlled in such a way that the user profile is not transmitted to similar devices, but that user profiles from other devices are allowed to be received.

The invention claimed is:

1. An information processing device comprising:
a first memory arranged to store units of primary information, the primary information including digital audio files in MP3 format and descriptive information including the title and performer of each digital audio file;
an audio player arranged to play the stored digital audio files;
an interface arranged to allow a first user to select digital audio files to be played;
a second memory arranged to store a first user profile regarding the selections, the first user profile based at least in part on how often the digital audio files are played and including rating information for various music categories and performers;
a receiver arranged to receive wirelessly at least a part of a second user profile directly from a similar portable device in proximity to the information processing device regarding second user selections a second user makes from units of primary information stored on the similar portable device, wherein said second user selections include rating information for various music categories and performers; and a processor configured to
- determine a match between the first user profile and the second user profile received from the similar portable device through the receiver, said match being a measure of a resemblance between the first user profile and the second user profile, and
- identify through the interface the resemblance.

2. The device according to claim 1, wherein the first user profile includes rating information related to the units of primary information and information about a person from whom the unit of primary information has been acquired, including information as to whether the person's taste depends on the time of day.

3. The device according to claim 1, wherein the digital audio files are in MP3 format and the processor is further programmed to:
- retrieve a stored digital audio file selected by the first user from the first memory and cause the audio player to play the user selected digital audio file;
- determine how often each digital audio file is played; and
- under user control, activate or deactivate communication with the similar portable device.

\* \* \* \* \*